3,466,216
LIGHT SENSITIVE COATING FOR LIGHT TRANSMITTING BODY
William H. Cooley, 1228 Westmoor Road, Winnetka, Ill. 60093, and Kenneth C. Allison, 1546 S. Shore Drive, Crystal Lake, Ill. 60014
No Drawing. Filed July 23, 1964, Ser. No. 384,777
Int. Cl. B44f *1/06;* B32b *17/06*
U.S. Cl. 161—5                 7 Claims

ABSTRACT OF THE DISCLOSURE

A light transmitting article including a light transmitting body coated with a light sensitive film comprising a dispersion of finely divided particles of silver halide containing silicates in a binder to lighten and darken said body under varying conditions of light intensity.

---

This invention relates to glass and other articles of light transmitting material and more particularly is concerned with articles of this nature having a film of light sensitive composition applied to a surface thereof which is effective to bring about a reduction of the light transmission quality of said article in response to exposure to light of increasing intensity and to cause the light transmission quality of said article to have greater light transmission property as the article undergoes exposure to light of decreasing intensity. Thus the application of a film composition to an article of light transmitting material as contemplated by this invention is operable to establish a reversible condition of lighting or darkening of the article in response to exposure of said article to variations of light intensity.

Experiments with silicate compounds containing silver halide crystals of sufficiently small size to produce a highly crystalline transparent body have shown that such silver halide crystals when precipitated in glass will darken under exposure to light of predetermined intensity and which will thereupon return to a lightened condition or greater transparency when such exposure is stopped or reduced.

The present invention accordingly envisions the dispersion of finely divided silicates containing such small silver halide crystals in a solution or suspension to produce a film which when bonded to a light transmitting body at the surface of such body will render said body susceptible to a darkening and clearing cycle by reaction of said film to variations in the intensity of the light to which the light transmitting body provided with such film is subjected.

In a film representing one embodiment of this invention, the silicates containing the silver halide crystals are dispersed in a solution or suspension of such consistency and such adherency as to be readily applied to the surface of a light transmitting body, such as a sheet of glass or the like, by spraying, dipping, rolling or any other means of distribution whereupon the coating thus applied is solidified and bonded to the surface of said light transmitting body. Depending on the composition of such solution or suspension, the resulting film, may, if desired, provide a permanent type layer of light sensitive material on the surface of the glass or other light transmitting material or the film provided thereby might be of such character as to be readily removed by means of suitable solvents. The solution might be water in which event the film would be erasable and thereby removed from the light transmitting body. The solution also might be of such composition as to form a film which is conveniently removed by peeling it from the surface of the light transmitting body.

Satisfactory coating compositions for use in forming a film according to this invention include the following examples:

An adhesive like material having the functions and capabilities of glue provides a form of coating composition suitable to the film of this invention.

Synthetic resins such as Plexiglas, styrene and other plastic compounds notable for transparency are also recognized as suitable film forming substances with which silicates containing silver halide crystals can be combined to obtain a light sensitive coating or layer for application to light transmitting bodies in accordance with this invention.

Light sensitive coatings embodying the present invention are also obtainable by the dispersion of silicates containing silver halide crystals in a water solution, including a water solution containing a mixture of soap.

In a film representing another embodiment of the present invention, a preformed sheet of light transmitting synthetic resinous material and having as a substantial component thereof a uniformly dispersed mass of silver halide containing silicates is provided whereby the results which this invention is designed to accomplish may be obtained by the use of a suitable adhesive between the interfacing surfaces of said film and a light transmitting body. Such a preformed sheet of light sensitive character would have a thickness in the range of .001 to .005 inch. If desired, such a film in a preformed state, also lends itself to the production of laminated safety glass of the type generally employed in windshields which use two sheets of glass and an interposed layer of thermoplastic material bonded together under action of heat and pressure to form a composite unitary structure. Thus silver halide containing particles dispersed through such an interposed layer of plastic material provides a laminated glass unit having shatterproof quality as well as a light sensitive glare screen which causes the glass unit to undergo reversible conditions of lightening or darkening through variation of light intensity.

The color of the film forming compositions referred to herein may be varied as desired by the addition of suitable pigments or dyes.

The objects of this invention are achieved by using silver halide containing silicate particles having an average particle size no larger than about 35 to 40 microns and in a concentration of from 1 to 100 parts of film forming material to each par of said particles.

The silicates may be obtained in a particle size as indicated herein in any suitable manner. For example, a section of glass known as photochromic glass which contains crystals of silver halides effective to produce a reversible color change in response to exposure to light of varying intensity, is pulverized and run through a screen of suitable mesh to produce such desired particle size as contemplated by this invention. Due to the small size of the particles such pulverization of the glass will not materially deprive such crystals of silver halides of an envelope of glass and thereby the color centers of such crystals are protected against diffusion and growth into stable silver particles or prevented from reacting chemically to produce an irreversible decomposition of the silver halide.

In another method of producing desired particle size molten glass containing such crystals of silver halides may be formed into beads as in the processing of small glass beads. Such a process involves the provision of a zone of high turbulence which is effective to break up a high velocity stream of such molten glass to form glass rods which form such beads due to subsequent break-up of such rods while subjecting the rods to high temperatures and thereafter cooling such beads.

What is claimed is:
1. A light transmitting synthetic resinous film applied to the surface of a light transmitting body, said film having a thickness of approximately .005 inch and containing a dispersion of finely divided particles of silver halide containing silicates to lighten and darken said light transmitting body under varying conditions of light intensity.
2. An article according to claim 1 wherein said silicates have a particle size of less than 40 to 50 microns.
3. An article according to claim 1 wherein said film is susceptible to removal from the surface of the light transmitting body by the application of a suitable solvent to said film.
4. An article according to claim 1 wherein said film is strippable from the body.
5. A film coated body of light transmitting material according to claim 1 wherein said film is defined by a pre-formed sheet of a film forming composition and said film is applied to the surface of said light transmitting body while in said sheet formed condition.
6. A film coated body of light transmitting material according to claim 5 wherein said pre-formed sheet of film forming composition is of synthetic resinous substance.
7. A laminated safety glass in which two sheets of glass and an interposed layer of light transmitting synthetic resinous material are bonded together, and wherein said layer includes a film containing a dispersion of finely divided particles of silver halide containing silicates.

References Cited

UNITED STATES PATENTS

| | | | |
|---|---|---|---|
| 2,710,274 | 6/1955 | Kuehl | 161—199 |
| 3,208,860 | 9/1965 | Armistead et al. | 106—54 |
| 3,244,582 | 4/1966 | Kuhl | 161—199 |
| 3,252,374 | 5/1966 | Stookey | 88—61 |

ROBERT F. BURNETT, Primary Examiner

W. A. POWELL, Assistant Examiner

U.S. Cl. X.R.

106—52; 117—33.3; 156—106, 247, 309; 161—165, 192, 406, 408, 410; 252—300; 350—160